A. McKINLAY.
EGG BEATER.
APPLICATION FILED JULY 30, 1912.
1,101,560.
Patented June 30, 1914.
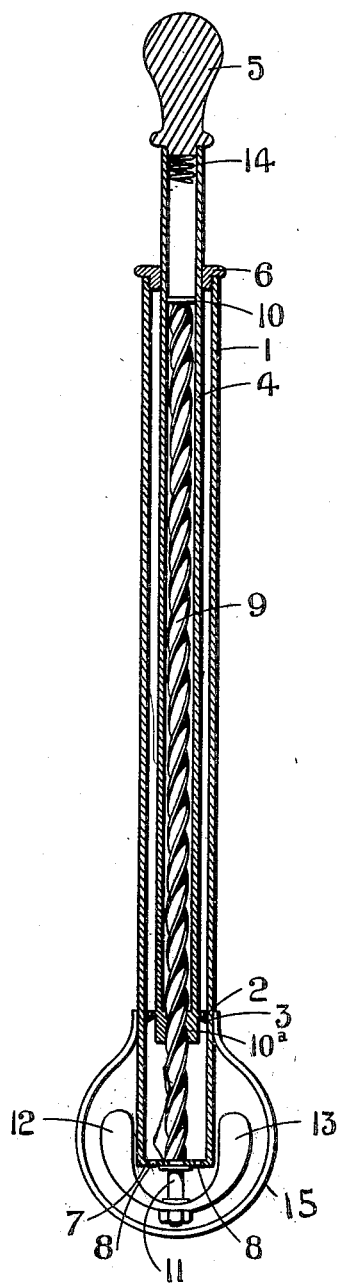

UNITED STATES PATENT OFFICE.

ALEXANDER McKINLAY, OF DUNEDIN, NEW ZEALAND.

EGG-BEATER.

1,101,560.   Specification of Letters Patent.   Patented June 30, 1914.

Application filed July 30, 1912. Serial No. 712,239.

*To all whom it may concern:*

Be it known that I, ALEXANDER McKINLAY, groom, subject of the King of Great Britain, residing at Dunedin, in the Dominion of New Zealand, have invented new and useful Improvements in Egg-Beaters, of which the following is a specification.

This invention is for an improved egg beater the leading feature of which is the aeration of the eggs during the operation of beating. This feature and the other features and combinations and arrangements of parts are hereinafter described with reference to the accompanying drawings illustrating the invention.

The tube or cylinder 1 has working within it a piston 2 provided with a valve 3 opening downward said piston being operated by the tubular piston rod 4 having a handle 5 with a spring buffer 14, the whole forming a force pump or air inflater. The tube 1 has a cap (6) at its upper end and a cap 7 at its lower end perforated to provide airholes 8. Within the tubular piston rod 4 a screw 9 is operated by a nut 10 at the lower end of the tubular piston rod 4 the upper end of the screw 9 being held by a washer 10ᵃ. A portion 11 projecting from the end of the screw 9 passes through the cap 7 at the lower end of the tube 1 and carries upwardly curved beaters 12, 13 secured to it. A guard 15 is secured to the outside of the tube and is adapted to embrace the beaters 12, 13.

In the drawings the device is shown with the piston near the end of the down stroke.

The eggs having been broken into a basin the device is held by the handle 5 and the curve of the guard 14 is held to the bottom of the basin. The piston rod is pulled upward by the handle 5 thus raising the piston to the upper end of the tube 1 and at the same time by means of the nut 10 operating on the screw 9 the beaters 12, 13 are caused to rotate, the piston rod is then thrust down causing air to be forced through the holes 8 into the eggs and at the same time causing the nut 10 operating on a screw 9 to rotate the beaters 12, 13 in a direction the reverse of its first rotation. This action is repeated until the eggs are aerated and beaten as desired.

Having now described my invention, what I claim as new and desire to secure by Letters Patent is:—

An egg beater, embodying therein an elongated outer tube having a perforated cap at one end thereof, a guard attached to said tube and surrounding the perforated cap, a tubular piston rod reciprocal within said outer tube, said tubular piston rod having a nut at one end thereof and an operating handle at the other end thereof, a valve carried by said piston rod and opening in the direction of said perforated cap, an elongated screw passing through said tubular piston rod and through said nut and said perforated cap, and beater arms carried at one end of said screw within said guard.

In testimony whereof I have signed my name to this specification in the presence of two subscribing witnesses.

ALEXANDER McKINLAY.

Witnesses:
  ANDREW JOHN PARK,
  AGNES HARKER RECKIE.

Copies of this patent may be obtained for five cents each, by addressing the "Commissioner of Patents, Washington, D. C."